United States Patent
Kushnerik

(10) Patent No.: US 12,017,674 B2
(45) Date of Patent: Jun. 25, 2024

(54) DIRECTIONAL AUDIO FOR DISTRACTED DRIVER APPLICATIONS

(71) Applicant: Toyota Motor North America, Inc., Plano, TX (US)

(72) Inventor: Michael R. Kushnerik, The Colony, TX (US)

(73) Assignees: TOYOTA MOTOR NORTH AMERICA, INC., Plano, TX (US); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 110 days.

(21) Appl. No.: 17/929,484

(22) Filed: Sep. 2, 2022

(65) Prior Publication Data

US 2024/0075945 A1 Mar. 7, 2024

(51) Int. Cl.
*B60W 50/14* (2020.01)
*B60W 40/08* (2012.01)
(Continued)

(52) U.S. Cl.
CPC ............ *B60W 50/14* (2013.01); *B60W 40/08* (2013.01); *G06F 3/165* (2013.01); *H04R 5/02* (2013.01);
(Continued)

(58) Field of Classification Search
CPC ................ B60W 50/14; B60W 40/08; B60W 2040/0818; B60W 2050/143;
(Continued)

(56) References Cited

U.S. PATENT DOCUMENTS

| | | | |
|---|---|---|---|
| 6,964,023 B2 | 11/2005 | Maes et al. | |
| 7,339,462 B1 * | 3/2008 | Diorio | H04S 7/30 340/456 |

(Continued)

FOREIGN PATENT DOCUMENTS

| | | |
|---|---|---|
| CN | 110475180 A | 11/2019 |
| JP | 5045302 B2 | 10/2012 |

OTHER PUBLICATIONS

Nukarinen et al., "Effects of directional haptic and non-speech audio cues in a cognitively demanding navigation task", Tampere University of Applied Sciences, NordiCHI '14, Oct. 26-30, 2014, Helsinki, Finland, 4 pages. (https://homepages.tuni.fi/tomi.nukarinen/nukarinennordichi14.pdf).

(Continued)

*Primary Examiner* — Nay Tun
(74) *Attorney, Agent, or Firm* — Jordan IP Law, LLC

(57) ABSTRACT

An in-cabin audio system includes: a plurality of speakers configured to play sound within a cabin; a distracted driver detection system configured to detect when a driver is distracted and to generate a distracted driver signal; an infotainment system configured to generate sound data; and a volume controller. The plurality of speakers include a first group of speakers and a second group of speakers. The plurality of speakers are configured to play the sound based on the sound data. The volume controller is configured control the plurality of speakers so as to operate in a normal mode or a distracted driver mode. The volume controller is configured to attenuate sound played by the first group of speakers and not to attenuate sound played by the second group of speakers in the distracted driver mode based on the distracted driver signal.

20 Claims, 8 Drawing Sheets

(51) Int. Cl.
*G06F 3/16* (2006.01)
*H04R 5/02* (2006.01)

(52) U.S. Cl.
CPC .............. *B60W 2040/0818* (2013.01); *B60W 2050/143* (2013.01); *B60W 2050/146* (2013.01); *B60W 2540/229* (2020.02); *H04R 2499/13* (2013.01)

(58) Field of Classification Search
CPC ....... B60W 2050/146; B60W 2540/229; G06F 3/165; H04R 5/02; H04R 2499/13
See application file for complete search history.

(56) References Cited

U.S. PATENT DOCUMENTS

| | | | |
|---|---|---|---|
| 8,019,454 B2* | 9/2011 | Haulick | H04S 7/302 |
| | | | 701/431 |
| 8,325,936 B2 | 12/2012 | Eichfeld et al. | |
| 9,301,077 B2* | 3/2016 | Hampiholi | H04R 3/04 |
| 10,552,695 B1 | 2/2020 | Bush et al. | |
| 2012/0306637 A1 | 12/2012 | Mcgough et al. | |
| 2016/0267335 A1 | 9/2016 | Hampiholi | |
| 2017/0303037 A1 | 10/2017 | Kobayashi et al. | |
| 2018/0077492 A1* | 3/2018 | Yamada | H04R 3/12 |
| 2020/0086788 A1* | 3/2020 | Pivnicka | B60K 35/26 |
| 2020/0189459 A1 | 6/2020 | Bush et al. | |
| 2020/0384916 A1* | 12/2020 | Tanaka | H04R 1/32 |
| 2023/0391354 A1* | 12/2023 | Baumgarten | B60W 40/08 |

OTHER PUBLICATIONS

Frank Gillett, "Smart audio: What tech innovations in sound will fuel new experiences?", Forrester.com, featured blog post, Jun. 9, 2020, 7 pages. (https://www.forrester.com/blogs/smart-audio-what-tech-innovations-in-soundwill-fuel-new-experiences/).

Android.com, "Automotive Audio", Android Open Source Project device document, Last updated May 3, 2022, retrieved Aug. 24, 2022, 11 pages. (https://source.android.com/devices/automotive/audio).

* cited by examiner

DIRECTIONAL AUDIO FOR DISTRACTED DRIVER APPLICATIONS

BACKGROUND

Embodiments relate to systems that perform a function when distracted driving is detected.

SUMMARY

An aspect of the present disclosure is drawn to an in-cabin audio system for use with a vehicle having a cabin and a driver of the vehicle within the cabin. The in-cabin audio system includes: a plurality of speakers configured to play sound within the cabin; a distracted driver detection system configured to detect when the driver is distracted and to generate a distracted driver signal; an infotainment system configured to generate sound data; and a volume controller. The plurality of speakers include a first group of speakers and a second group of speakers. The plurality of speakers are configured to play the sound based on the sound data. The volume controller is configured control the plurality of speakers so as to operate in a normal mode or a distracted driver mode. The volume controller is configured to attenuate sound played by the first group of speakers and not to attenuate sound played by the second group of speakers in the distracted driver mode based on the distracted driver signal.

In some embodiments of this aspect, the in-cabin audio system further includes a user interface configured to notify the driver when the volume controller is controlling the plurality of speakers so as to operate in the distracted driver mode. In some of these embodiments, the user interface includes a display configured to display a message that the volume controller is controlling the plurality of speakers so as to operate in the distracted driver mode when the volume controller is controlling the plurality of speakers so as to operate in the distracted driver mode. In other of these embodiments, the infotainment system is further configured to generate notification sound data of a message that the volume controller is controlling the plurality of speakers so as to operate in the distracted driver mode when the volume controller is controlling the plurality of speakers so as to operate in the distracted driver mode, and one of the plurality of speakers is configured to play a notification sound based on the notification sound data. In other of these embodiments, the user interface is configured to enable the driver to cause the volume controller to switch the plurality of speakers from operating in the distracted driver mode to operating in the normal mode.

In some embodiments of this aspect, one of the first group of speakers is located closest to the driver. In some of these embodiments, the first group of speakers includes only the one of the first group of speakers that is located closest to the driver.

Another aspect of the present disclosure is drawn to a method of using an in-cabin audio system with a vehicle having a cabin and a driver of the vehicle within the cabin. The method includes: generating, via an infotainment system, generate sound data; playing sound, via a plurality of speakers including a first group of speakers and a second group of speakers, sound based on the sound data; detecting, via a distracted driver detection system, when the driver is distracted; generating, via the distracted driver detection system, a distracted driver signal; controlling, via a volume controller configured to execute instruction stored on a memory, the plurality of speakers so as to operate in a normal mode; and controlling, via the volume controller, the plurality of speaker so as to operate in a distracted driver mode so as to attenuate sound played by the first group of speakers and not to attenuate sound played by the second group of speakers based on the distracted driver signal.

In some embodiments of this aspect, the method further includes notifying, via a user interface, the driver when the volume controller is controlling the plurality of speakers so as to operate in the distracted driver mode. In some of these embodiments, the notifying, via a user interface, the driver when the volume controller is controlling the plurality of speakers so as to operate in the distracted driver mode includes displaying, via a display, a message that the volume controller is controlling the plurality of speakers so as to operate in the distracted driver mode when the volume controller is controlling the plurality of speakers so as to operate in the distracted driver mode. In other of these embodiments, the method further includes generating, via the infotainment system, notification sound data of a message that the volume controller is controlling the plurality of speakers so as to operate in the distracted driver mode when the volume controller is controlling the plurality of speakers so as to operate in the distracted driver mode; and playing, via one of the plurality of speakers, a notification sound based on the notification sound data. In still other of these embodiments, the method further includes enabling, via the user interface, the driver to cause the volume controller to switch the plurality of speakers from operating in the distracted driver mode to operating in the normal mode. In other of these embodiments, one of the first group of speakers is located closest to the driver.

In some embodiments of this aspect, the first group of speakers includes only the one of the first group of speakers that is located closest to the driver.

Another aspect of the present disclosure is drawn to a non-transitory, computer-readable media having computer-readable instructions stored thereon, wherein the computer-readable instructions are capable of being read by an in-cabin audio system for use with a vehicle having a cabin and a driver of the vehicle within the cabin. The computer-readable instructions are capable of instructing the controller to perform the method including: generating, via an infotainment system, generate sound data; playing sound, via a plurality of speakers including a first group of speakers and a second group of speakers, sound based on the sound data; detecting, via a distracted driver detection system, when the driver is distracted; generating, via the distracted driver detection system, a distracted driver signal; controlling, via a volume controller configured to execute instruction stored on a memory, the plurality of speakers so as to operate in a normal mode; and controlling, via the volume controller, the plurality of speaker so as to operate in a distracted driver mode so as to attenuate sound played by the first group of speakers and not to attenuate sound played by the second group of speakers based on the distracted driver signal.

In some embodiments of this aspect, the computer-readable instructions are capable of instructing the in-cabin audio system to perform the method, further including notifying, via a user interface, the driver when the volume controller is controlling the plurality of speakers so as to operate in the distracted driver mode. In some of these embodiments, the computer-readable instructions are capable of instructing the in-cabin audio system to perform the method wherein the notifying, via a user interface, the driver when the volume controller is controlling the plurality of speakers so as to operate in the distracted driver mode includes displaying, via a display, a message that the volume controller is controlling the plurality of speakers so as to operate in the distracted driver mode when the volume controller is controlling the plurality of speakers so as to operate in the distracted driver mode. In other of these embodiments, the computer-readable instructions are capable of instructing the in-cabin audio system to perform the method further including: generating, via the infotainment system, notification sound data of a message that the volume controller is controlling the plurality of speakers so as to operate in the distracted driver mode when the volume controller is controlling the plurality of speakers so as to operate in the distracted driver mode; and playing, via one of the plurality of speakers, a notification sound based on the notification sound data. In other of these embodiments, the computer-readable instructions are capable of instructing the in-cabin audio system to perform the method further including enabling, via the user interface, the driver to cause the volume controller to switch the plurality of speakers from operating in the distracted driver mode to operating in the normal mode.

In other embodiments of this aspect, the computer-readable instructions are capable of instructing the in-cabin audio system to perform the method wherein one of the first group of speakers is located closest to the driver.

BRIEF SUMMARY OF THE DRAWINGS

The accompanying drawings, which are incorporated in and form a part of the specification, illustrate example embodiments and, together with the description, serve to explain the principles of the innovation. In the drawings.

DETAILED DESCRIPTION

Driving while distracted increases the likelihood of an accident. For this reason, the automobile industry have taken steps to both detect distracted driving, and then to mitigate distracted driving once detected. Such distractions include a high volume of sound produced by an infotainment system within the cabin of the vehicle. By reducing the sound, after detecting distracted driving, the goal is to reduce the amount of distraction. This in turn will reduce the likelihood of an accident.

Figure 1A:
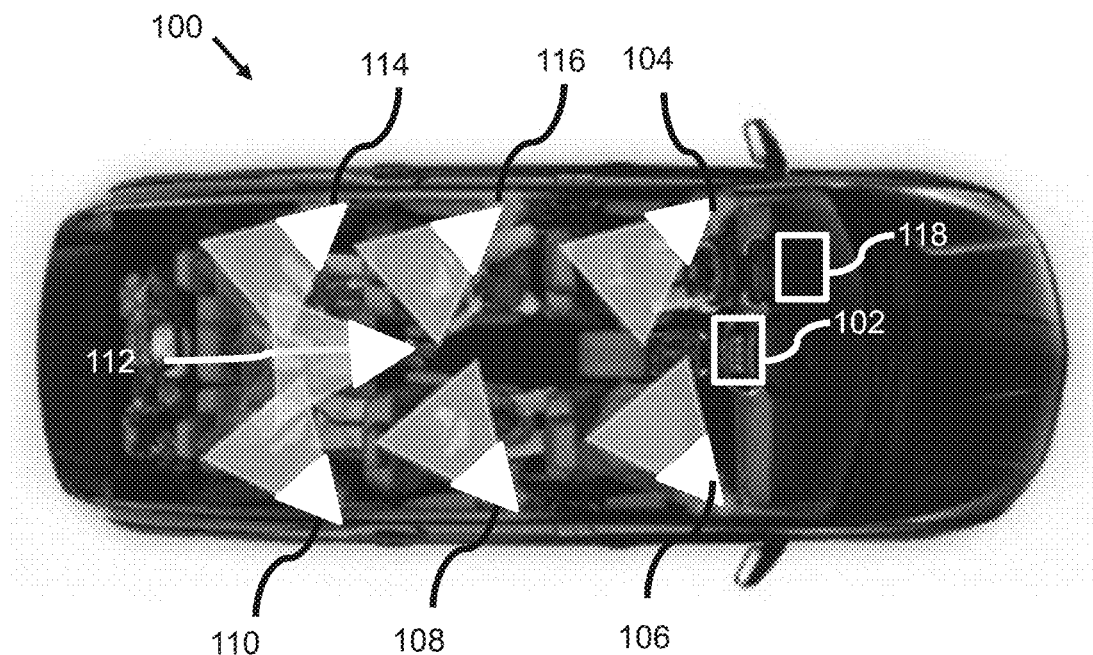
FIG. 1A illustrates a vehicle having a related art distracted driver audio system at a time $t_1$.

FIG. 1A illustrates a vehicle 100 having a related art distracted driver audio system at a time $t_1$.

As shown in the figure, vehicle 100 includes an in-vehicle infotainment (IVI) system 102, speakers 104, 106, 108, 110, 112, 114, and 116, and a distracted driver detection system (DDDS) 118.

IVI system 102 may be any known collection of hardware and software to be used in automobiles that provides audio or video entertainment. In car entertainment originated with car audio systems that consisted of radios and cassette or CD players, and now includes automotive navigation systems, video players, USB and Bluetooth connectivity, Carputers, in-car internet, and Wi-Fi. Once controlled by simple dashboards knobs and dials, IVI systems can include steering wheel audio controls, handsfree voice control, touch-sensitive preset buttons, and even touch screens on higher-end units.

IVI system 102 is configured to generate sound data, associated with songs or videos.

Speaker 104 is positioned closest to the driver so as to provide sound to the driver. Speaker 106 is positioned closest to the front passenger so as to provide sound to the front passenger. Speaker 108 is positioned closest to the middle passenger-side passenger so as to provide sound to the middle passenger-side passenger. Speaker 110 is positioned closest to the rear passenger-side passenger so as to provide sound to the rear passenger-side passenger. Speaker 112 is positioned closest to the rear middle passenger so as to provide sound to the middle rear passenger. Speaker 114 is positioned closest to the rear driver-side passenger so as to provide sound to the rear driver-side passenger. Speaker 116 is positioned closest to the middle driver-side passenger so as to provide sound to the middle driver-side passenger.

Speakers 104, 106, 108, 110, 112, 114, and 116 are configured to play sound based on the sound data generated by IVI system 102.

DDDS 118 may be any known vehicle safety system to assess the driver's alertness, attentiveness, sleepiness or combination thereof. The functions of distracted driver detection system 118 may co-operate with a pre-collision system (not shown), may detect if the driver is becoming sleepy by monitoring the eyelids, and may monitor whether the driver is attentive based on swerving within a driving lane.

In a normal mode of operation, IVI system 102 generates sound data associated with music or videos for those within vehicle 100. IVI system 102 may additionally have a screen to display images or play videos for those within vehicle 100. Speakers 104, 106, 108, 110, 112, 114, and 116 play sound based on the sound data generated by IVI system 102. Further, IVI system 102 includes a volume control so that a person may control the volume of the sound emitted by speakers 104, 106, 108, 110, 112, 114, and 116.

For purposes of this discussion, let the sound emitted by speakers 104, 106, 108, 110, 112, 114, and 116 be at some set volume while a driver is driving vehicle 100. Now, for purposes of discussion, suppose that DDDS 118 determines that the driver of vehicle 100 is distracted. To limit the distraction to the driver, DDDS 118 may instruct IVI system 102 to attenuate, or even turn off, speakers 104, 106, 108, 110, 112, 114, and 116. This will be described in greater detail with reference to FIG. 1B.

Figure 1B:
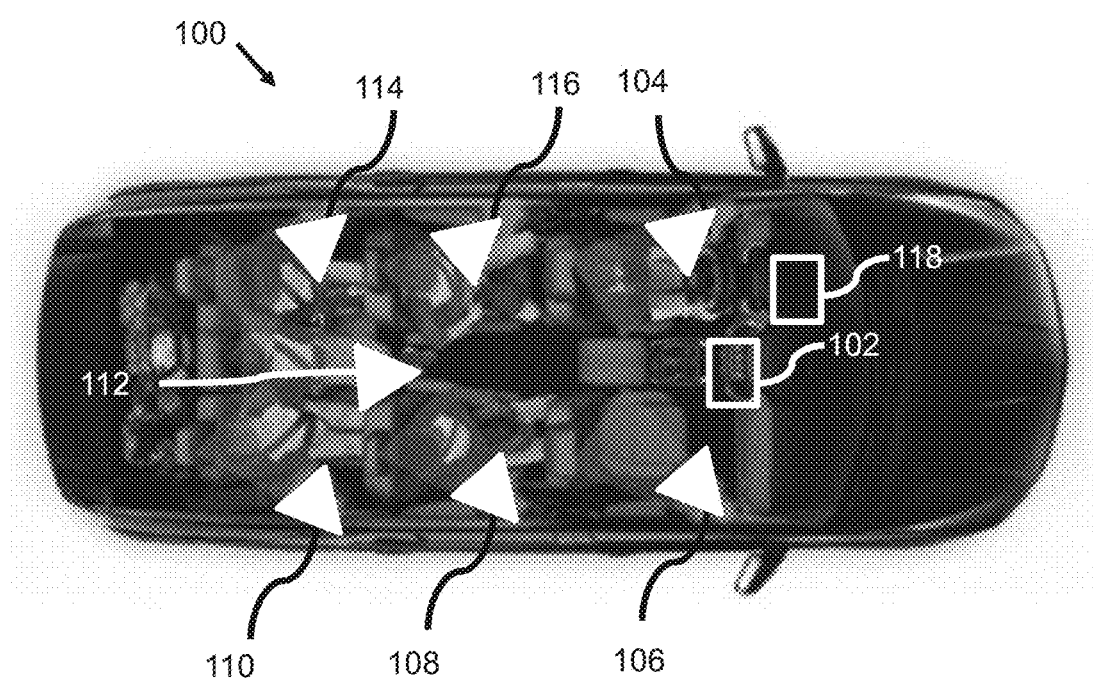
FIG. 1B illustrates the vehicle of FIG. 1A at a time $t_2$.

FIG. 1B illustrates vehicle 100 at a time $t_2$.

As shown in the figure, all of speakers 104, 106, 108, 110, 112, 114, and 116 have been turned off in order to decrease distraction to the driver. While turning off all speakers in vehicle 100 may indeed decrease distraction to the driver, the riding experience for all the passengers in vehicle 100 is also decreased.

What is needed is a system and method for decreasing driver distraction while minimizing a decrease in riding experience for the remaining passengers.

An in-cabin audio system and method of operating the same in accordance with the present disclosure decreases driver distraction while minimizing a decrease in riding experience for the remaining passengers.

The present disclosure includes an in-cabin audio system having a plurality of speakers, a DDDS, and IVI system and a volume controller. The volume controller can control the speakers to operate in a normal mode or a distracted driver mode. In the normal mode, the speakers provide sound as set by someone in the vehicle via the IVI system. The normal mode is the default mode of operation.

However, if the DDDS detects that the driver is being distracted, then the DDDS will directly or indirectly send a distracted driver signal to the volume controller. The IVI system may include a user interface that notifies the driver of the detected distracted driving and that a distracted driving mode is available.

If the driver declines the distracting driving mode, then all the speakers will continue to operate in the normal mode.

If the driver accepts the distracting driving mode, then the volume controller will attenuate, or even turn off, a set of the speakers, while permitting the remainder of the speakers to operate as they were in the normal mode. In one example, the controller instructs the speaker closest to the driver to turn off, whereas the remaining speakers within the vehicle are permitted to operate as they were in the normal mode.

A system and method for decreasing driver distraction while minimizing a decrease in riding experience for the remaining passengers will now be described in greater detail with reference to FIGS. 2A-4E.

Figure 2A:
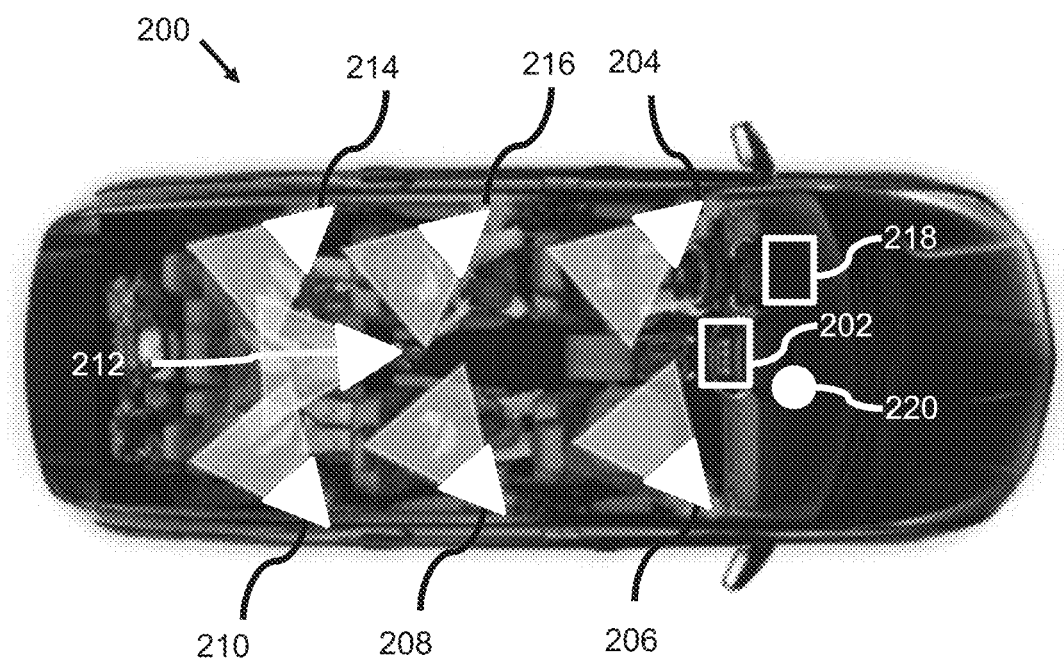
FIG. 2A illustrates an example vehicle having a distracted driver audio system in accordance with aspects of the present disclosure at a time $t_3$.

FIG. 2A illustrates an example vehicle 200 having a distracted driver audio system in accordance with aspects of the present disclosure at a time $t_3$.

As shown in the figure vehicle 200 includes an in-vehicle infotainment (IVI) system 202, speakers 204, 206, 208, 210, 212, 214, and 216, a DDDS 218, and a microphone 220.

IVI system 202 may perform function similar to IVI system 102 discussed above with reference to FIGS. 1A-B. Further, as will be described in greater detail below, in some embodiments, IVI system 202 is additionally configured to notify the driver when a volume controller is controlling speakers 204, 206, 208, 210, 212, 214, and 216 so as to operate in a distracted driver mode. Further, as will be described in greater detail below, in some embodiments, IVI system 202 is additionally configured to generate notification sound data of a message that the volume controller is controlling speakers 204, 206, 208, 210, 212, 214, and 216 so as to operate in the distracted driver mode when the volume controller is controlling speakers 204, 206, 208, 210, 212, 214, and 216.

Further, speakers 204, 206, 208, 210, 212, 214, and 216 have a similar layout to and may perform functions similar to speakers 104, 106, 108, 110, 112, 114 and 116, respectively, as discussed above with reference to FIGS. 1A-B.

Still further, DDDS 218 is similar in function to DDDS 118 discussed above with reference to FIGS. 1A-B.

Microphone 220 may be any known type of microphone that is configured to detect sound within vehicle 200.

In a normal mode of operation, IVI system 202 generates sound data associated with music or videos for those within vehicle 200. IVI system 202 additionally includes a screen to display images or play videos for those within vehicle 200. Speakers 204, 206, 208, 210, 212, 214, and 216 play sound based on the sound data generated by IVI system 202.

Further, IVI system 202 includes a volume control so that a person may control the volume of the sound emitted by speakers 204, 206, 208, 210, 212, 214, and 216.

For purposes of this discussion, let the sound emitted by speakers 204, 206, 208, 210, 212, 214, and 216 be at some set volume while a driver is driving vehicle 200. Now, for purposes of discussion, suppose that DDDS 218 determines that the driver of vehicle 200 is distracted. To limit the distraction to the driver, DDDS 218 may instruct IVI system 202 to operate in a distracted driver mode. In the distracted driver mode, a first group of speakers of speakers 204, 206, 208, 210, 212, 214, and 216 will be attenuated, or even turned off, whereas a second group of speakers of speakers 204, 206, 208, 210, 212, 214, and 216 will continue to operate as if in the normal mode of operation. This will be described in greater detail with reference to FIG. 2B.

Figure 2B:
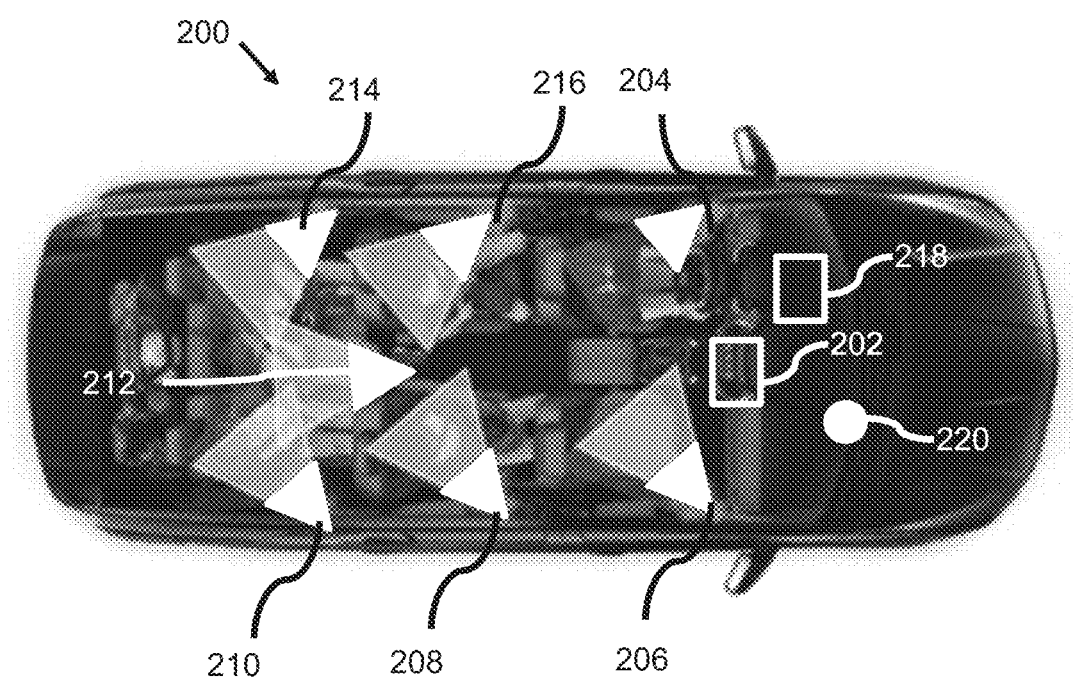
FIG. 2B illustrates the vehicle of FIG. 2A at a time $t_5$.

FIG. 2B illustrates vehicle 200 of FIG. 2A at a time $t_5$.

As shown in the figure, speaker 204, which is closest to the driver is turned off, whereas the remaining speakers 206, 208, 210, 212, 214, and 216 remain operating as they were as discussed above with reference to FIG. 2A. In this manner the distraction to the driver is decreased, whereas a decrease in the riding experience for all the passengers in vehicle 200 is minimized.

An example in-cabin audio system and method of operating the same in accordance with aspects of the present disclosure will now be described with reference to FIGS. 3-4E.

Figure 3:
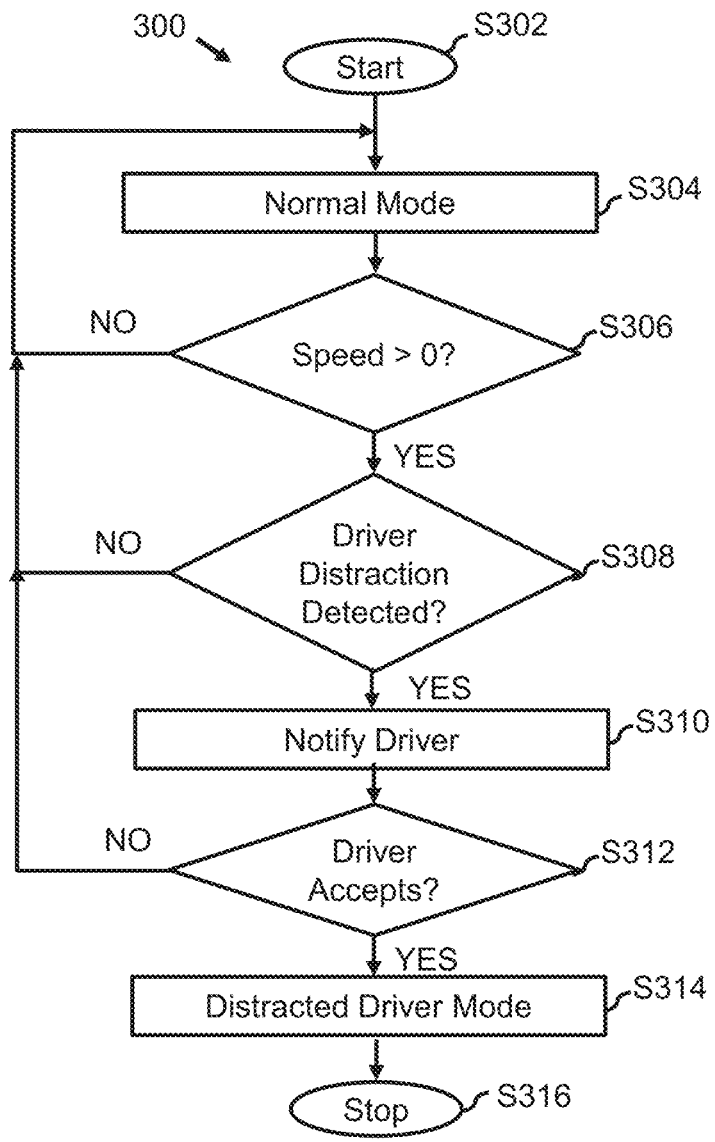
FIG. 3 illustrates an example method of operating a distracted driver audio system in accordance with aspects of the present disclosure.

FIG. 3 illustrates an example method 300 of operating a distracted driver audio system in accordance with aspects of the present disclosure.

As shown in the figure, method 300 starts (S302), and the distracted driver audio system operates in a normal mode (S304). For example, as shown in FIG. 2A, and as discussed above, all speakers 204, 206, 208, 210, 212, 214, and 216 are providing sound based on the sound data generated by IVI system 202. This will be described in greater detail with reference to FIG. 4A.

Figure 4A:
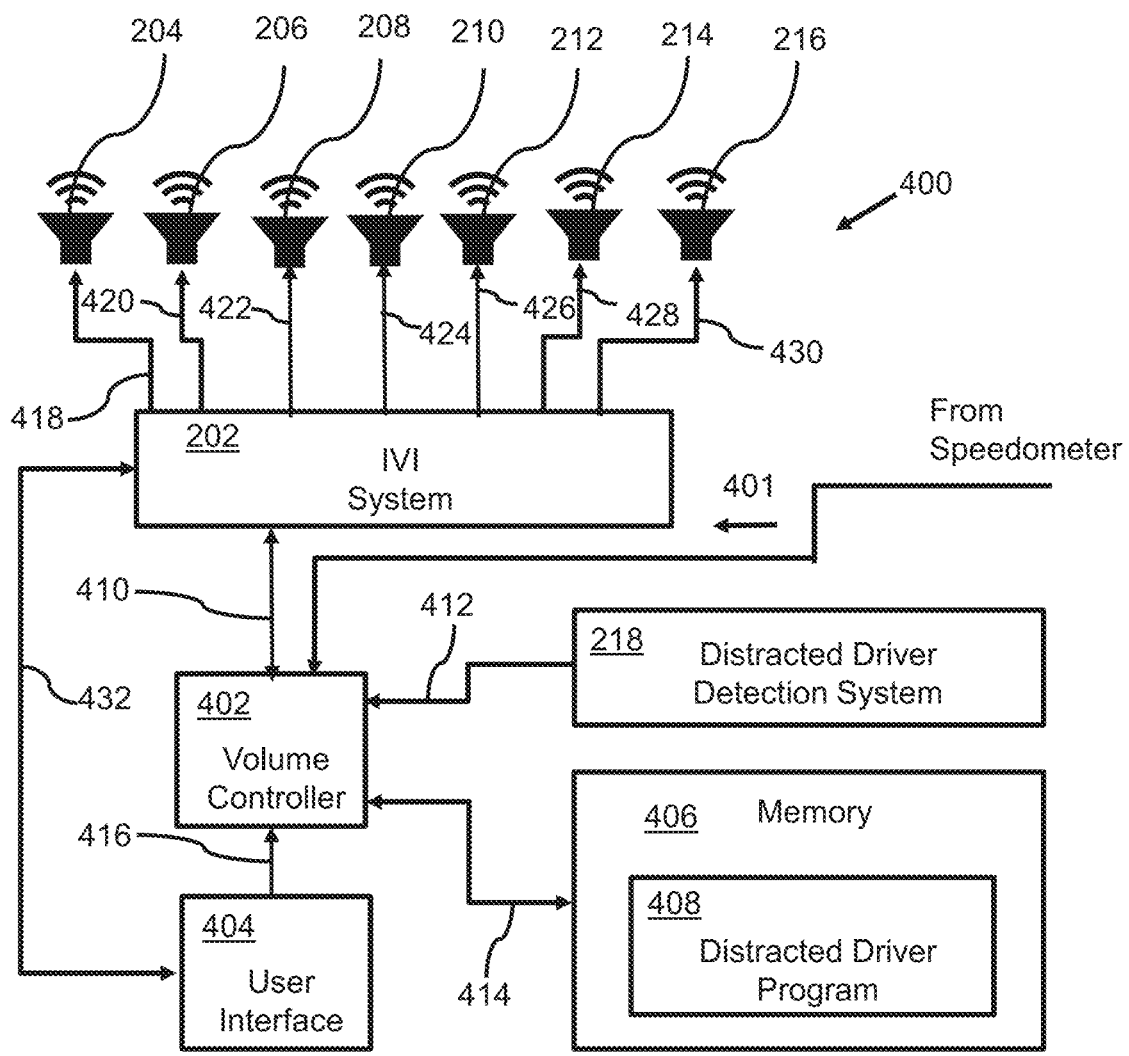
FIG. 4A illustrates an example distracted driver audio system in accordance with aspects of the present disclosure at time $t_3$.

FIG. 4A illustrates an example distracted driver in-cabin audio system 400 in accordance with aspects of the present disclosure at time $t_3$.

As shown in the figure, distracted driver in-cabin audio system 400 includes IVI 202, speakers 204, 206, 208, 210, 212, 214, and 216, DDDS 218, a volume controller 402, a user interface (UI) 404 and a memory 406, which has stored therein a distracted driver program 408.

In this example, IVI system 202, DDDS 218, volume controller 402, UI 404 and memory 406 are illustrated as individual devices. However, in some embodiments, at least two of IVI system 202, DDDS 218, volume controller 402, UI 404 and memory 406 may be combined as a unitary device. Further, in some embodiments, at least one of IVI system 202, DDDS 218, volume controller 402, UI 404 and memory 406 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from and write information to the tangible computer-readable media. In the alternative, the tangible computer-readable media may be integral to the processor. The processor and the tangible computer-readable media may reside in an integrated circuit (IC), an application specific integrated circuit (ASIC), or large-scale integrated circuit (LSI), system LSI, super LSI, or ultra LSI components that perform a part or all of the functions described herein. In the alternative, the processor and the tangible computer-readable media may reside as discrete components.

Example tangible computer-readable media may also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Volume controller 402 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of distracted driver in-cabin audio system 400 in accordance with the embodiments described in the present disclosure.

Memory 406, as will be described in greater detail below, has instructions, including distracted driver program 408, stored therein to be executed by volume controller 402 causing distracted driver in-cabin audio system 400 to: control speakers 204, 206, 208, 210, 212, 214, and 216 so as to operate in a normal mode or a distracted driver mode; and to attenuate sound played by a first group of speakers within speakers 204, 206, 208, 210, 212, 214, and 216 and not to attenuate sound played by a second group of speakers within speakers 204, 206, 208, 210, 212, 214, and 216 in the distracted driver mode based on a distracted driver signal.

UI 404 may be any device or system that is configured to enable a user to access and control volume controller 402 and IVI system 202. UI 404 may include one or more layers including a human-machine interface (HMI) machines with physical input hardware such a keyboards, mice, game pads and output hardware such as computer monitors, speakers, and printers. Additional UI layers in UI 404 may interact with one or more human senses, including: tactile UI (touch), visual UI (sight), and auditory UI (sound).

In some embodiments, as will be described in more detail below, UI 404 is configured to notify the driver when volume controller 402 is controlling speakers 204, 206, 208, 210, 212, 214, and 216 so as to operate in the distracted driver mode.

In some embodiments, as will be described in more detail below, UI 404 includes a display configured to display a message that volume controller 402 is controlling speakers 204, 206, 208, 210, 212, 214, and 216 so as to operate in the distracted driver mode when volume controller 402 is controlling speakers 204, 206, 208, 210, 212, 214, and 216 so as to operate in the distracted driver mode.

In some embodiments, as will be described in more detail below, UI 404 is configured to enable the driver to cause volume controller 402 to switch speakers 204, 206, 208, 210, 212, 214, and 216 from operating in the distracted driver mode to operating in the normal mode.

Volume controller 402 is arranged to: communicate with IVI system 202 via a communication channel 410; communicate with DDDS 218 via a communication channel 412; communicate with memory 406 via a communication channel 414; communicate with UI 404 via a communication channel 416; and to communicate with IVI system 202 via a communication channel 416.

UI 404 is additionally arranged to communicate with IVI system 202 via a communication channel 432.

IVI system 202 is additionally arranged to communicate with speakers 204, 206, 208, 210, 212, 214, and 216 via communication channels 418, 420, 422, 424, 426, 428, and 430, respectively.

Any of communication channels 410, 412, 414, 416, 418, 420, 422, 424, 426, 428, 430, and 432, may be any known type of communication channel, non-limiting examples of which include wired communication channels and wireless communication channels.

In operation, a user, e.g., the driver or one of the passengers, turns on IVI system 202 to play a movie or to listen to some audio. For purposes of discussion, let IVI system 202 be playing music. In other words, IVI system 202 generates audio data to be sent to speakers 204, 206, 208, 210, 212, 214, and 216. The user interacts with UI 404 to control the volume of the sound produced by speakers 204, 206, 208, 210, 212, 214, and 216. UI 404 then instructs volume controller 402, based on the input by the user, to instruct IVI system 202 to generate the audio data with the corresponding volume as set by the user. This is a normal mode of operation of speakers 204, 206, 208, 210, 212, 214, and 216.

At this point, the driver and passengers may enjoy the music within the cabin of vehicle 200 as shown in FIG. 2A.

Returning to FIG. 3, after the distracted driver audio system operates in a normal mode (S304), it is determined whether the speed of the vehicle is greater than zero (S306). S304 is not limited to determining whether the speed of the vehicle is greater than zero but may be implemented to determine whether the speed of the vehicle is greater than another predetermined speed value In this example, as shown in FIG. 4A, volume controller 402 may receive a velocity signal 401 from a speedometer (not shown) in vehicle 200, wherein velocity signal 401 indicates the current velocity of vehicle 200.

If the value of velocity signal 401 is zero, then vehicle 200 is not moving. Otherwise, vehicle 200 is moving, meaning that the driver is actually driving vehicle 200. In these cases, the driver may be subject to distracted driving.

Returning to FIG. 3, if it is determined that the speed of the vehicle is zero (NO at S306), then the distracted driver audio system continues to operate in the normal mode (return to S304). In particular, if the speed of vehicle 200 is zero, then vehicle 200 might be parked, stopped at stop light, stopped in traffic, etc. In such cases, the driver may be permitted to be distracted, so there is no need to even detect for distracted driving, let alone try to mitigate it.

However, if it is determined that the speed of the vehicle is greater than zero (YES at S306), then it is determined whether the driver is driving in a distracted manner (S308). For example, as shown in FIG. 4A, DDDS system 218 will determine whether the driver is driving in a distracted manner by known methods.

Returning to FIG. 3, if it is determined that the driver is not driving in a distracted manner (NO at S308), then the distracted driver audio system continues to operate in the normal mode (return to S304). However, if it is determined that the driver is driving in a distracted manner (YES at S308), then the driver is notified (S310). This will be described in greater detail with reference to FIG. 4B.

Figure 4B:
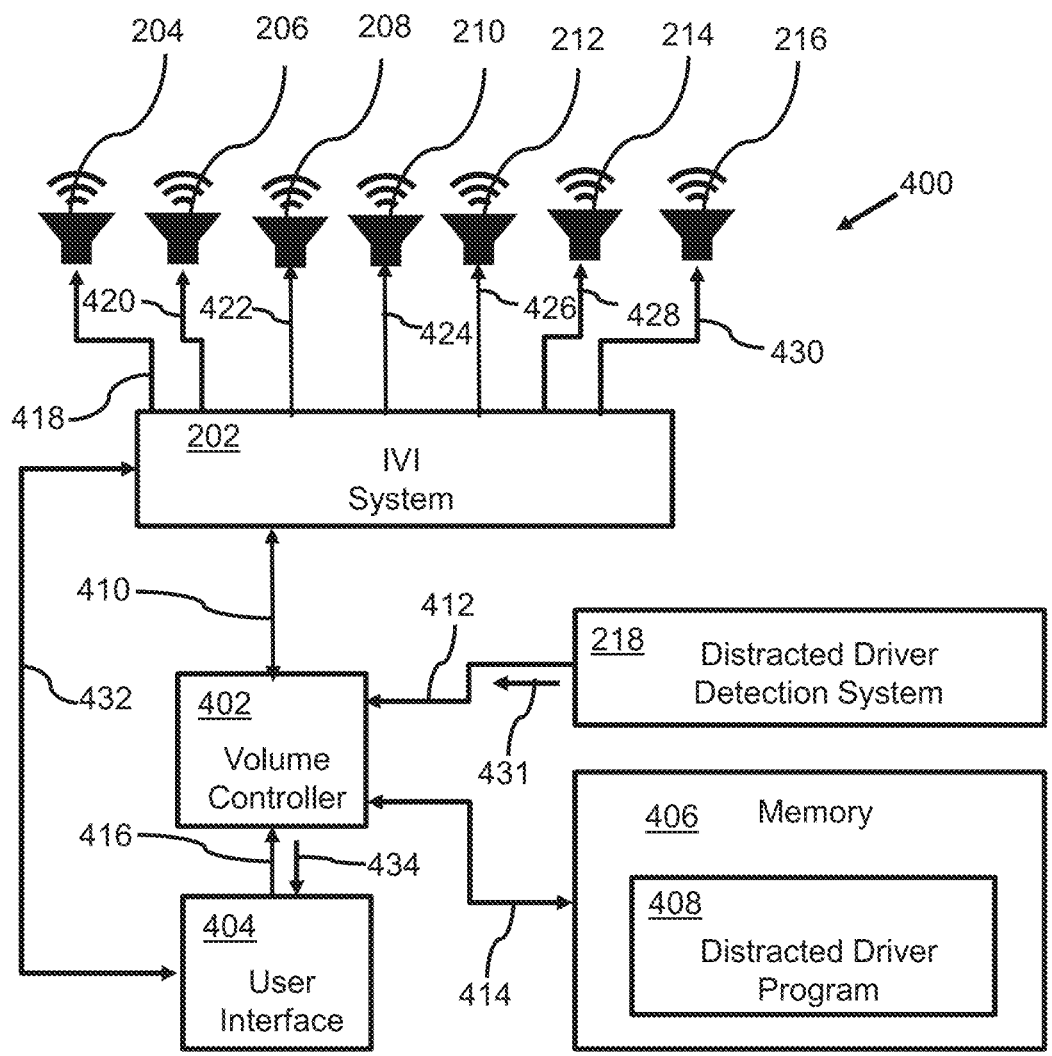
FIG. 4B illustrates the distracted driver audio system of FIG. 4A at time $t_4$.

FIG. 4B illustrates distracted driver audio system 400 at time $t_4$.

As shown in the figure, when DDDS 218 detects that the driver is driving in a distracted manner, DDDS 218 generates a distracted driver signal 431. DDDS 218 transmits distracted driver signal 431 to volume controller 402. Volume controller 402, in response to receiving distracted driver signal 431, executes instructions in distracted driver program 408 to generate a distracted driver notification signal 434. Volume controller 402 then transmits distracted driver notification signal 434 to UI 404 to cause UI 404 to display a message of the detected distracted driving and whether to operate in a distracted driving mode.

Returning to FIG. 3, after the driver is notified (S310), it is determined whether the driver accepts (S312). This will be described in greater detail with reference to FIG. 4C.

Figure 4C:
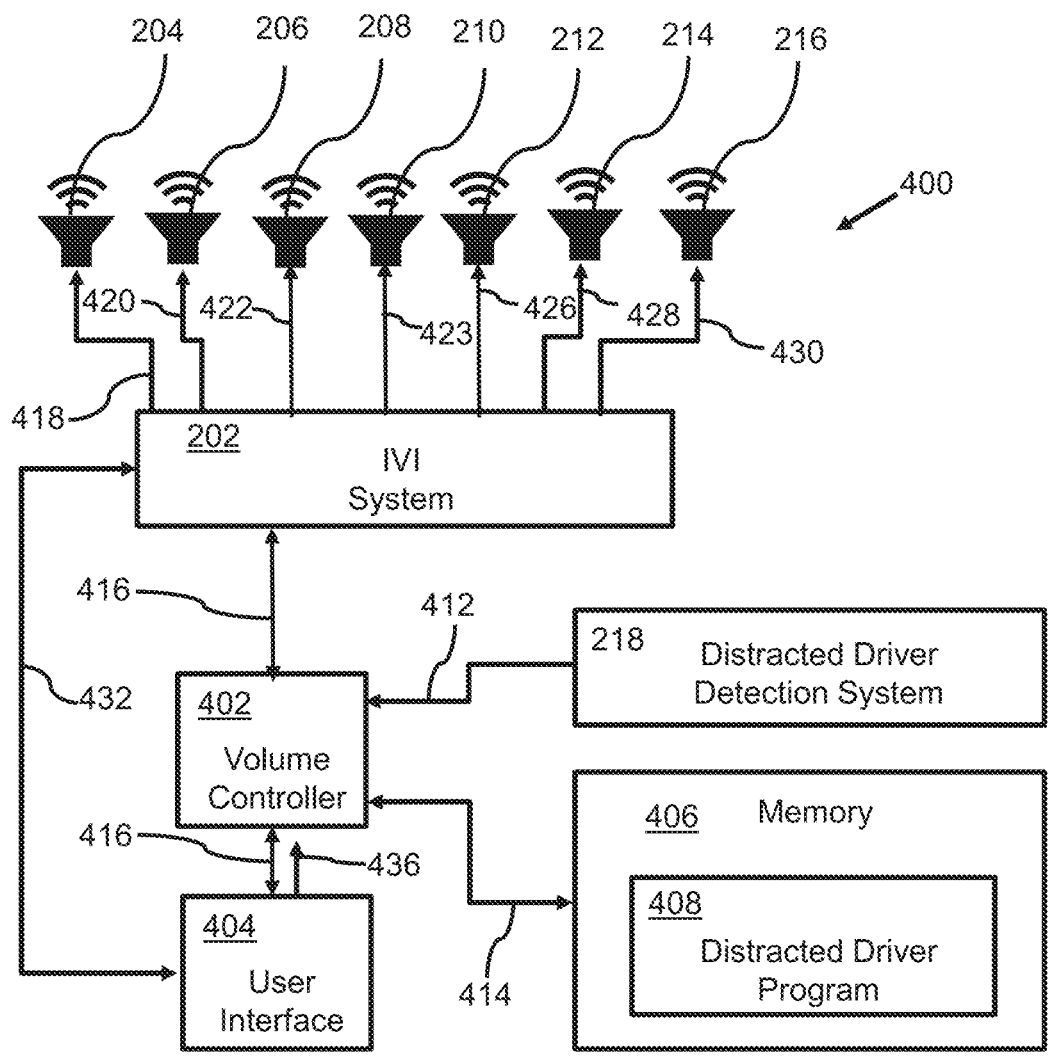
FIG. 4C illustrates the distracted driver audio system of FIG. 4A at time $t_5$.

FIG. 4C illustrates distracted driver audio system 400 at time $t_5$.

As shown in the figure, the driver may interact with UI 404 via a touch display to chose a "YES" or "NO" response. In other embodiments, the driver may accept or decline the distracted driving mode via a voice activation. For example, returning to FIG. 2A, the driver may say "YES" or "NO," which will be detected by microphone 220. While not shown in FIG. 4B, microphone 220 may be included in UI 404.

UI 404 will generate a driver response signal 436 and transmit the driver response signal 436 to volume controller 404. In a non-limiting example embodiments, driver response signal 436 is a one (1) bit binary signal, indicating either activation of the distracted driving mode or non-activation of the distracted driving mode.

Returning to FIG. 3, if it is determined that the driver does not accept (NO at S312), then the distracted driver audio system continues to operate in the normal mode (return to S304). However, if it is determined that the driver does accept (YES at S312), then the distracted driver audio system operates in a distracted driver mode (S314). This will be described in greater detail with reference to FIG. 4D.

Figure 4D:
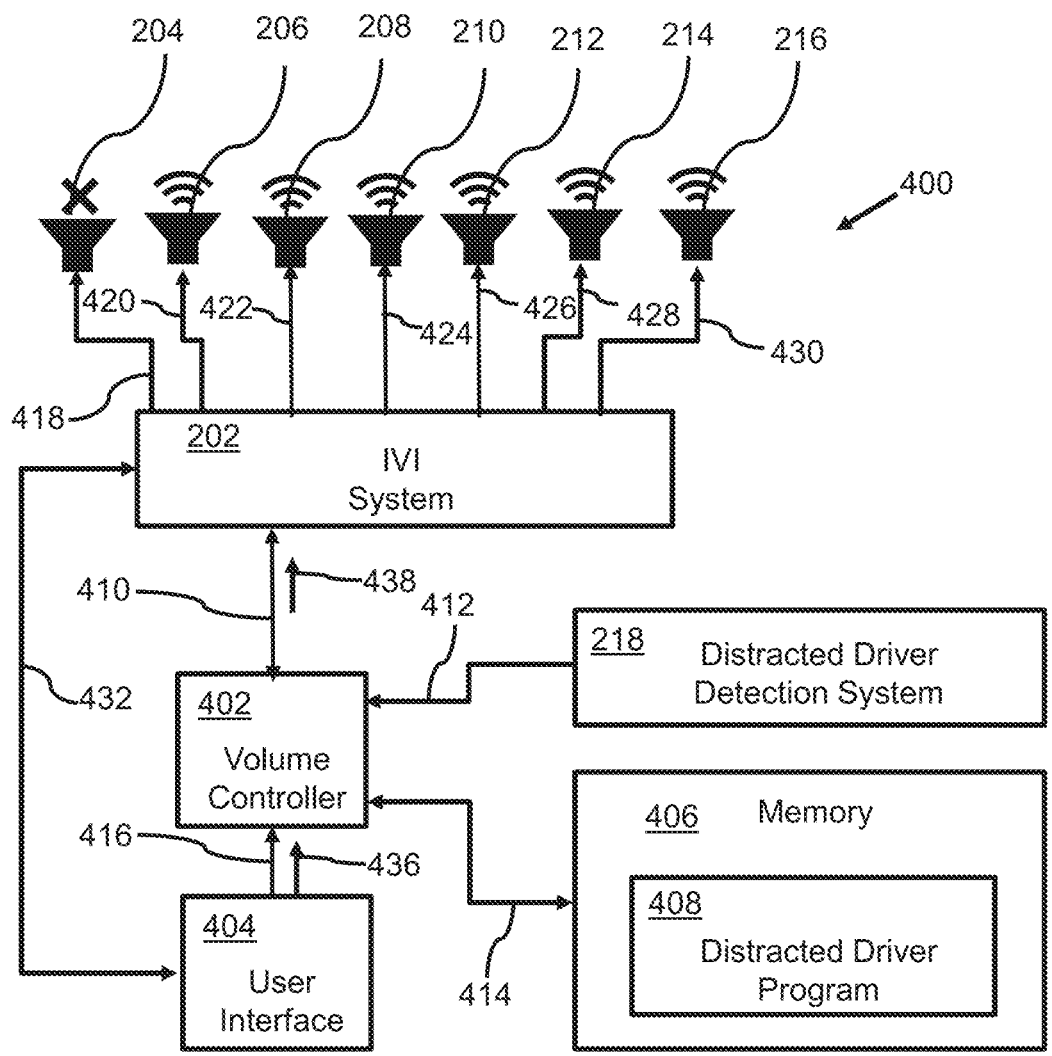
FIG. 4D illustrates the distracted driver audio system of FIG. 4A at time $t_6$.

FIG. 4D illustrates distracted driver audio system 400 at time $t_6$.

As shown in the figure, UI 404 transmits driver response signal 436 to volume controller 402. In this case, driver response signal 436 indicates activation of the distracted driving mode. In response to receiving driver response signal 436, volume controller 402 executes instructions in distracted driver program 408 to generate a mode switching signal 438. Volume controller 402 transmits mode switching signal 438 to IVI system 202, which causes IVI system 202 to operate in the distracted driving mode.

In this non-limiting example embodiment, mode switching signal 438 instructs IVI system 202 to mute speaker 204 and to permit speakers 206, 208, 210, 212, 214, and 216 to continue to operate as if in the normal mode of operation. This is reflected in FIG. 2, wherein speaker 204, which is closest to the driver, is muted, whereas the remaining speaker are operating normally.

It should be noted that in the embodiment discussed above with reference to FIG. 4B, only the speaker closest to the driver, i.e., speaker 420, is muted during the distracted driver mode of operation. However, in other embodiments, additional speakers may be muted, this will be described with reference to FIG. 4E.

Figure 4E:
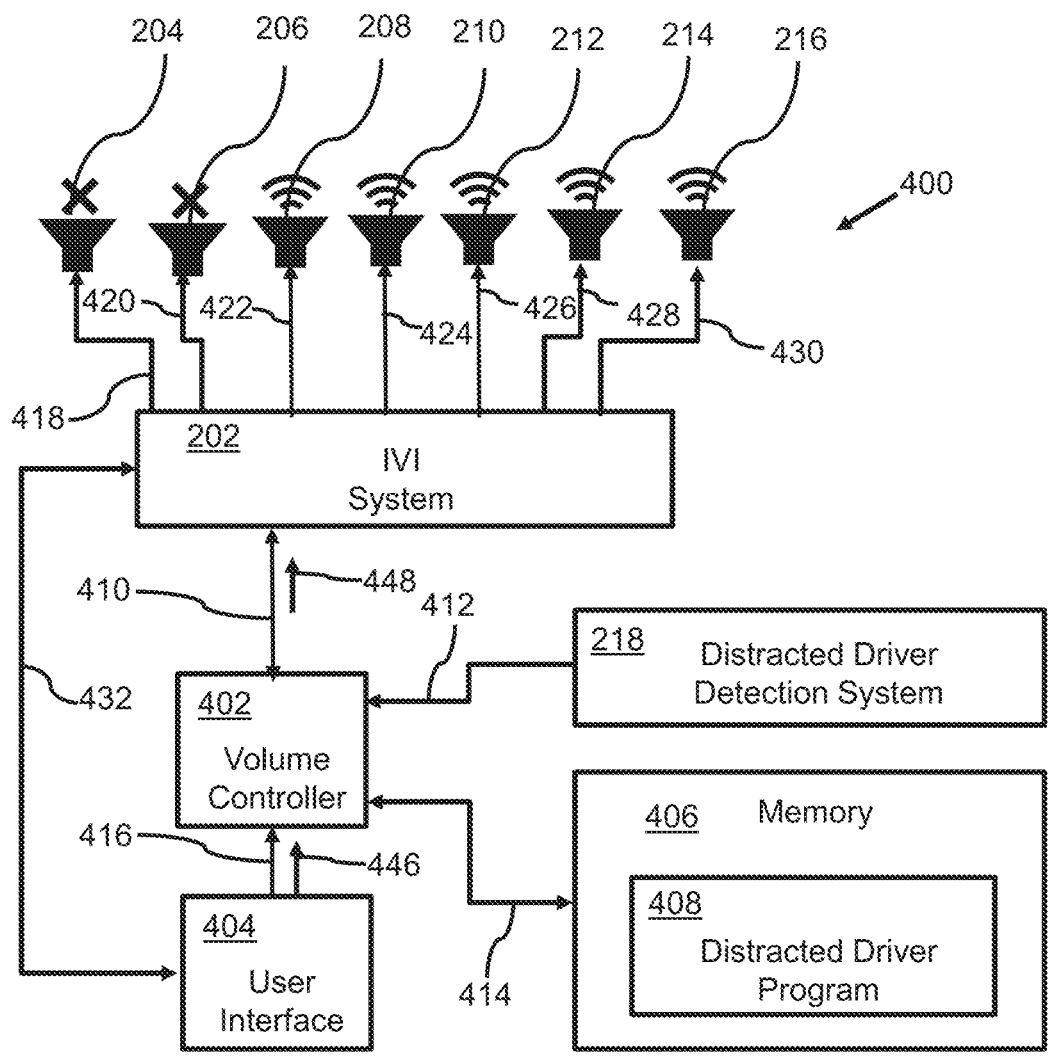
FIG. 4E illustrates the distracted driver audio system of FIG. 4A at time $t_7$.

FIG. 4E illustrates distracted driver audio system 400 at time t 7.

As shown in the figure, in this embodiment, UI 404 transmits a driver response signal 446 to volume controller 402. In this case, driver response signal 446 indicates activation of the distracted driving mode. In response to receiving driver response signal 446, volume controller 402 executes instructions in distracted driver program 408 to generate a mode switching signal 448. Volume controller 402 transmits mode switching signal 448 to IVI system 202, which causes IVI system 202 to operate in the distracted driving mode.

In this non-limiting example embodiment, mode switching signal 448 instructs IVI system 202 to mute speakers 204 and 206, but to permit speakers 208, 210, 212, 214, and 216 to continue to operate as if in the normal mode of operation. As compared with the embodiment discussed above with reference to FIG. 4D, in this embodiment the speaker closest to the driver, i.e. speaker 204, and the other speaker in the front of vehicle 200, i.e. speaker 206, are muted.

In general, so long as at least one speaker is operating in the normal mode of operation, the distraction to the driver is decreased, whereas the decrease in the riding experience for the remaining passengers is minimized.

Returning to FIG. 3, after the distracted driver audio system operates in a distracted driver mode (S314), method 300 stops (S316).

In the above discussed non-limiting example embodiments, some speakers are muted during the distracted driver mode. However, in accordance with aspects of the present disclosure, the volume of some speakers may merely be attenuated as opposed to muted.

In some embodiments, the distracted driving mode may continue for a predetermined period of time as indicated in distracted driver program 408.

In some embodiments, the driver may cause volume controller 402 to instruct IVI system 202 to switch from the distracted driver mode of operation back to the normal mode of operation via interaction with UI 404.

In the non-limiting examples discussed above with reference to FIGS. 2A-4E, vehicle 200 includes seven speakers. It should be noted that a system in accordance with aspects of the present disclosure may be implemented with any number of a plurality of speakers.

Related art systems that mute all speakers in the vehicle might reduce distraction of a driver that has been determined to be distracted. However, muting all speakers decreases the riding experience to the remainder of the passengers in the vehicle.

In accordance with aspects of the present disclosure, only a portion of the speakers are attenuated, or muted, whereas the remainder of the speakers operate in a normal manner when distracted driving is detected. Therefore, a system in accordance with aspects of the present disclosure reduces driver distraction, while minimizing a decrease in the riding experience to the remainder of the passengers in the vehicle.

The foregoing description of various preferred embodiments have been presented for purposes of illustration and description. It is not intended to be exhaustive or to limit the embodiments to the precise forms disclosed, and obviously many modifications and variations are possible in light of the above teaching. The example embodiments, as described above, were chosen and described in order to best explain the principles of the innovation and its practical application to thereby enable others skilled in the art to best utilize the invention in various embodiments and with various modifications as are suited to the particular use contemplated. It is intended that the scope of the invention be defined by the claims appended hereto.

What is claimed is:

1. An in-cabin audio system of a vehicle having a cabin and a driver of the vehicle within the cabin, said in-cabin audio system comprising:
    a plurality of speakers configured to play sound within the cabin;
    a distracted driver detection system configured to detect when the driver is distracted and to generate a distracted driver signal;
    an infotainment system configured to generate sound data; and
    a volume controller,
    wherein said plurality of speakers include a first group of speakers and a second group of speakers,
    wherein said plurality of speakers are configured to play the sound based on the sound data,
        wherein said volume controller is configured to control said plurality of speakers so as to operate in a normal mode or a distracted driver mode, and
        wherein said volume controller is configured to attenuate sound played by said first group of speakers and not to attenuate sound played by said second group of speakers in the distracted driver mode based on the distracted driver signal.

2. The in-cabin audio system of claim 1, further comprising a user interface configured to notify the driver when said volume controller is controlling said plurality of speakers so as to operate in the distracted driver mode.

3. The in-cabin audio system of claim 2, wherein said user interface includes a display configured to display a message that said volume controller is controlling said plurality of speakers so as to operate in the distracted driver mode when said volume controller is controlling said plurality of speakers so as to operate in the distracted driver mode.

4. The in-cabin audio system of claim 2,
    wherein said infotainment system is further configured to generate notification sound data of a message that said volume controller is controlling said plurality of speakers so as to operate in the distracted driver mode, and
    wherein one of said plurality of speakers is configured to play a notification sound based on the notification sound data.

5. The in-cabin audio system of claim 2, wherein said user interface is configured to enable the driver to cause said volume controller to switch said plurality of speakers from operating in the distracted driver mode to operating in the normal mode.

6. The in-cabin audio system of claim 1, wherein one of said first group of speakers is located closest to the driver.

7. The in-cabin audio system of claim 6, wherein said first group of speakers comprises only said one of said first group of speakers that is located closest to the driver.

8. A method of using an in-cabin audio system with a vehicle having a cabin and a driver of the vehicle within the cabin, said method comprising:
    generating, via an infotainment system, sound data;
    playing sound, via a plurality of speakers including a first group of speakers and a second group of speakers, based on the sound data;
    detecting, via a distracted driver detection system, when the driver is distracted;
    generating, via the distracted driver detection system, a distracted driver signal;
    controlling, via a volume controller configured to execute instruction stored on a memory, the plurality of speakers so as to operate in a normal mode; and
    controlling, via the volume controller, the plurality of speakers so as to operate in a distracted driver mode so as to attenuate sound played by the first group of speakers and not to attenuate sound played by the second group of speakers based on the distracted driver signal.

9. The method of claim 8, further comprising notifying, via a user interface, the driver when the volume controller is controlling the plurality of speakers so as to operate in the distracted driver mode.

10. The method of claim 9, wherein said notifying, via the user interface, the driver when the volume controller is controlling the plurality of speakers so as to operate in the distracted driver mode comprises displaying, via a display, a message that the volume controller is controlling the plurality of speakers so as to operate in the distracted driver mode when the volume controller is controlling the plurality of speakers so as to operate in the distracted driver mode.

11. The method of claim 9, further comprising:
generating, via the infotainment system, notification sound data of a message that the volume controller is controlling the plurality of speakers so as to operate in the distracted driver mode when the volume controller is controlling the plurality of speakers so as to operate in the distracted driver mode; and
playing, via one of the plurality of speakers, a notification sound based on the notification sound data.

12. The method of claim 9, further comprising enabling, via the user interface, the driver to cause the volume controller to switch the plurality of speakers from operating in the distracted driver mode to operating in the normal mode.

13. The method of claim 8, wherein one of the first group of speakers is located closest to the driver.

14. The method of claim 13, wherein the first group of speakers comprises only the one of the first group of speakers that is located closest to the driver.

15. A non-transitory, computer-readable media having computer-readable instructions stored thereon, the computer-readable instructions being capable of being read by an in-cabin audio system for use with a vehicle having a cabin and a driver of the vehicle within the cabin, wherein the computer-readable instructions are capable of instructing a controller to perform a method comprising:
generating, via an infotainment system, generate sound data;
playing sound, via a plurality of speakers including a first group of speakers and a second group of speakers, sound based on the sound data;
detecting, via a distracted driver detection system, when the driver is distracted;
generating, via the distracted driver detection system, a distracted driver signal;
controlling, via a volume controller configured to execute instruction stored on a memory, the plurality of speakers so as to operate in a normal mode; and
controlling, via the volume controller, the plurality of speaker so as to operate in a distracted driver mode so as to attenuate sound played by the first group of speakers and not to attenuate sound played by the second group of speakers based on the distracted driver signal.

16. The non-transitory, computer-readable media of claim 15, wherein the computer-readable instructions are capable of instructing the in-cabin audio system to perform the method, further comprising notifying, via a user interface, the driver when the volume controller is controlling the plurality of speakers so as to operate in the distracted driver mode.

17. The non-transitory, computer-readable media of claim 16, wherein the computer-readable instructions are capable of instructing the in-cabin audio system to perform the method wherein said notifying, via the user interface, the driver when the volume controller is controlling the plurality of speakers so as to operate in the distracted driver mode comprises displaying, via a display, a message that the volume controller is controlling the plurality of speakers so as to operate in the distracted driver mode when the volume controller is controlling the plurality of speakers so as to operate in the distracted driver mode.

18. The non-transitory, computer-readable media of claim 16, wherein the computer-readable instructions are capable of instructing the in-cabin audio system to perform the method further comprising:
generating, via the infotainment system, notification sound data of a message that the volume controller is controlling the plurality of speakers so as to operate in the distracted driver mode when the volume controller is controlling the plurality of speakers so as to operate in the distracted driver mode; and
playing, via one of the plurality of speakers, a notification sound based on the notification sound data.

19. The non-transitory, computer-readable media of claim 16, wherein the computer-readable instructions are capable of instructing the in-cabin audio system to perform the method further comprising enabling, via the user interface, the driver to cause the volume controller to switch the plurality of speakers from operating in the distracted driver mode to operating in the normal mode.

20. The non-transitory, computer-readable media of claim 15, wherein the computer-readable instructions are capable of instructing the in-cabin audio system to perform the method wherein one of the first group of speakers is located closest to the driver.

* * * * *